United States Patent
McConnell

(10) Patent No.: US 6,996,571 B2
(45) Date of Patent: Feb. 7, 2006

(54) XML STORAGE SOLUTION AND DATA INTERCHANGE FILE FORMAT STRUCTURE

(75) Inventor: Christopher Clayton McConnell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 10/186,029

(22) Filed: Jun. 28, 2002

(65) Prior Publication Data

US 2004/0205585 A1 Oct. 14, 2004

(51) Int. Cl.
*G06F 17/30* (2006.01)
(52) U.S. Cl. ...................... 707/101; 707/100
(58) Field of Classification Search ............... 707/100, 707/101, 104, 6, 10, 103 Y, 104.1, 102; 715/524, 715/523, 513; 709/203
See application file for complete search history.

(56) References Cited

U.S. PATENT DOCUMENTS

| | | | |
|---|---|---|---|
| 6,636,845 B2 * | 10/2003 | Chau et al. ..................... 707/1 |
| 6,643,633 B2 * | 11/2003 | Chau et al. ..................... 707/1 |
| 6,704,736 B1 * | 3/2004 | Rys et al. ..................... 707/100 |
| 6,721,727 B2 * | 4/2004 | Chau et al. ..................... 707/3 |
| 6,725,231 B2 * | 4/2004 | Hu et al. ...................... 707/102 |
| 6,757,869 B1 * | 6/2004 | Li et al. ....................... 715/513 |
| 6,766,330 B1 * | 7/2004 | Chen et al. ................. 707/102 |
| 6,772,413 B2 * | 8/2004 | Kuznetsov ................. 717/136 |
| 6,775,680 B2 * | 8/2004 | Ehrman et al. ............. 707/102 |
| 6,785,673 B1 * | 8/2004 | Fernandez et al. ............. 707/3 |
| 6,799,184 B2 * | 9/2004 | Bhatt et al. ................. 707/102 |
| 2002/0091702 A1 * | 7/2002 | Mullins ....................... 707/100 |
| 2003/0101169 A1 * | 5/2003 | Bhatt et al. ..................... 707/3 |
| 2003/0106021 A1 * | 6/2003 | Mangrola ................... 715/513 |

OTHER PUBLICATIONS

Iraklis et al., "Bridging XML schema and relational databases. Asystem for generating and manipulating relational databases using valid XML documents", ACM, Nov. 9-10, 2001.*

Milo et al., "Exchanging intensional XML Data", ACM, Jun. 9-12, 2003.*

Dietrich et al., "Exploring XML for data exchange in the context of an undergraduate database curriculum", ACM, Feb. 23-27, 2005.*

Ives et al., "An XML query engine for network bound data", ACM, Jul. 1, 2002.*

* cited by examiner

*Primary Examiner*—Jean M. Corrielus
(74) *Attorney, Agent, or Firm*—Woodcock Washburn LLP

(57) ABSTRACT

A relational database management system having an XML storage implementation to reduce overhead associated with consuming data from multiple data providers, where each having proprietary database schemas. The XML storage solution allows data from any arbitrary relational database schema to be loaded, rearranged and retrieved. The system is adapted to receive and managing data from external content providers by exposing a predetermined provider content file formats. These formats use XPath as a schema reference, as a definition of legal combinations, and as a pattern to match other XPaths.

17 Claims, 9 Drawing Sheets

XML STORAGE SOLUTION AND DATA INTERCHANGE FILE FORMAT STRUCTURE

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2002, Microsoft Corporation, All Rights Reserved.

FIELD OF THE INVENTION

This invention relates in general to the field of information storage. More particularly, this invention relates to an XML storage solution for receiving and managing data received from multiple data providers.

BACKGROUND OF THE INVENTION

Internet portals and search engines, such as MSN®, serve as information gateways to Internet users by accumulating and categorizing information, and providing a wide array of services. Two methods are generally utilized to accumulate information and content to populate a portal's site. The first method is crawling the Web for information by utilizing so-called "spider" programs that examine Web pages looking for a variety of components. The spider scores each page for relevancy using the portal's search engine's proprietary algorithm. A limitation of this technique is that relevant information is often missed or ignored by the spider. Further, information that is contained within databases accessed via websites, i.e., information that must be queried to be retrieved, is not retrieved by spiders. Thus, searches conducted by visitors of portals that acquire information in this manner often do not yield satisfactory results and information. These dissatisfied visitors often leave the portal for another source of information.

The second method of acquiring data involves receiving content directly from affiliated data providers and importing the data into the portal's database management system. In the second method, the portals may regularly receive data from hundreds of sources. A limitation of this method is that data providers must conform to the portal's particular data format. Another limitation is that the data must be checked for accuracy, as errors in the importation are common. Yet another limitation is that if the data provider changes its own format, the data aggregator must conform to these changes. This is burdensome on the data providers and the portal operator, and makes it difficult for the portal to add new providers of data and content.

Related to the technical field of data exchange and interoperability, and the second method above, XML is quickly becoming a universal format for structured documents and data on the Web and in software programs. Structured data includes spreadsheets, address books, configuration parameters, financial transactions, and technical drawings. As is known in the art, the Extensible Markup Language (XML) is a set of rules for designing text formats that allows computers to generate and read data, and ensure that the data structure is unambiguous The XML Specification is defined in "Extensible Markup Language (XML) 1.0 (Second Edition)," W3C Recommendation, 6 Oct. 2000, which is incorporated herein by reference in its entirety.

In XML, tags are used to delimit the data within an XML data file ("instance document") and XML Schemas allow developers to precisely define the structures of their own XML-based formats. The data in the files may be manipulated via several modules and services. Such services include Xpointer, which is a syntax for pointing to parts of an XML document in a similar fashion as a Uniform Resource Locator (URL). Another service is XSL, which is the advanced language for expressing style sheets in XML. XSL is based on XSLT, which is the transformation language used for rearranging, adding and deleting tags and attributes.

Another service is XPath which provides a common syntax and semantics for functionality shared between XSLT and XPointer. XPath gets its name from its use of a path notation (as in URLs) for navigating through the hierarchical structure of an XML document. The primary purpose of XPath is to address parts of an XML document and it also provides basic facilities for manipulation of strings, numbers and booleans. XPath uses a compact, non-XML syntax to facilitate use of XPath within Uniform Resource Identifiers (URI) and XML attribute values. URIs are strings that identify resources in the web such as documents, images, downloadable files, services, electronic mailboxes, and other resources. XPath operates on the abstract, logical structure of an XML document, rather than its surface syntax.

In addition to its use for addressing, XPath can be used for matching, i.e., testing whether a node matches a pattern. XPath models an XML document as a tree of different types of nodes, e.g., element nodes, attribute nodes and text nodes. XPath fully supports XML Namespaces, where developers can qualify element names and relationships to make names recognizable and to avoid name collisions.

With all of these advantages, it is desirable to apply XML to the problem of receiving and processing data from external data providers. Thus, in view of the foregoing, there is a need for systems and methods that overcome the limitations and drawbacks of the prior art. In particular, there is a need for system by which portals and other data aggregators may utilize XML as a means of simplifying the transferring and validating data and content.

SUMMARY OF THE INVENTION

The present invention is directed to a platform having reduced overhead associated with consuming data from multiple data providers, each having proprietary database schemas, by creating a database system having an XML storage implementation. The XML storage solution allows data from any arbitrary relational database schema to be loaded, rearranged and retrieved. This is particularly useful for bringing in and managing partner data providers. Novel file formats are exposed as part of the platform. These formats use XPath as a schema reference, as a definition of legal combinations, and as a pattern to match other XPaths.

In accordance with the present invention, there is provided in a database management system having an XML storage solution defined by an XML schema, a method of receiving data from external content providers. The method includes: defining an XML provider content file format in accordance with the XML schema; providing the XML provider content file format to the external content providers; receiving a provider file from the external content providers that includes locations of a plurality of XML instance documents, each having a structure in accordance with the XML provider content file format; and importing content from the plurality of XML instance documents into the database management system. The plurality of XML instance documents may include an extension file, an instance file, and a phrase file that define the external content provider's schema and determines legal combinations of values.

According to another aspect of the invention, there is provided an XML data exchange system that includes a relational database system defined by an XML schema, a predetermined XML provider file structure, an exchange mechanism that references at least one provider file, and an import module that retrieves the at least one provider file and imports content contained therein into the relational database system.

According to yet another aspect of the invention, there is provided in a relational database management system for providing content and services to users via a network infrastructure, a method of populating the system in accordance with an XML schema defining a structure of XML documents used to receive content from sources of the content and services. The method includes receiving a provider file having references to a location of the content; retrieving at least one content file from the location; importing the content files into the relational database management system; and providing the content to users via a queryable interface.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The present invention is directed to systems and methods that provide for reducing the overhead to consume data provided by multiple data providers. The present invention is preferably implemented using XML file formats such that the data can be easily loaded, rearrange and retrieved.

Exemplary Computing Environment

Figure 1:
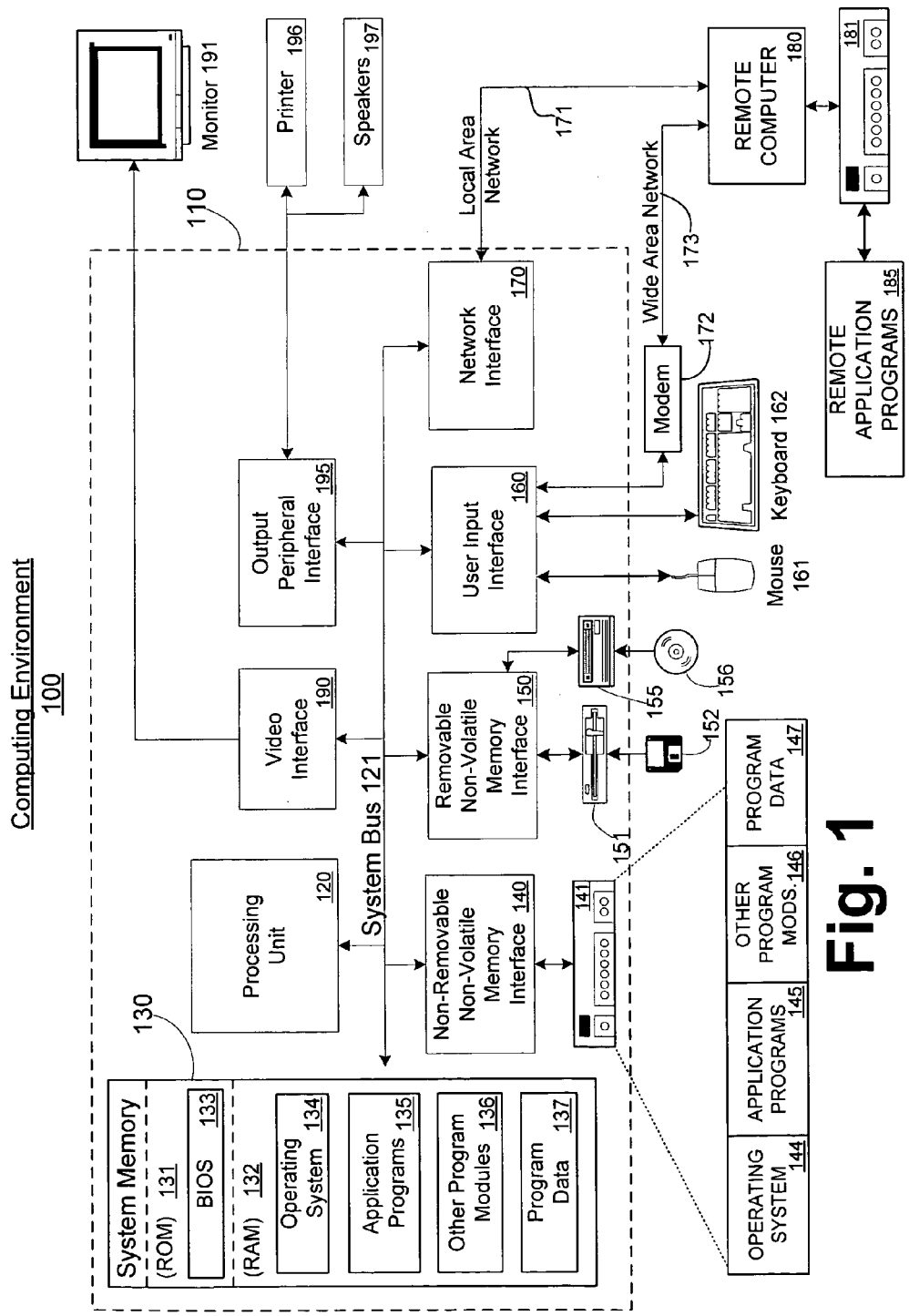
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within he scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that the debugging of the present invention may be performed by, supported in, or accessed via all of .NET's languages and services, and in other distributed computing frameworks as well.

Overview

The present invention is directed toward reducing the overhead associated with consuming data from multiple data providers, each having proprietary database schemas, by creating a database system having an XML storage solution. The XML storage solution allows data from any arbitrary relational database schema to be loaded, rearranged and retrieved by a data aggregator by utilizing novel file formats. The use of XML is preferable because there are standard tools for parsing, validating (XSD), querying (Xpath) and transforming (XSLT) data. Thus, an XML solution is particularly useful for receiving and managing data provided by affiliated providers.

The present invention utilizes specific interpretations of XPath constraints, and uses XPath to allow the natural expression of relations in a file format. In accordance with the present invention, the XML data transfer instance documents have a unique file format defined by a schema (described in further detail below with reference to FIGS. 2–15), and is provided to sources of data ("data providers") to specify what can and cannot be communicated to the data aggregator. Advantageously, the file format is independent of the actual implementation of the XML storage solution. The data transfer instance document uses XPath as a schema reference, to define the legal combinations and as a pattern to match other XPaths.

As used herein, an "instance" refers to a single partner entity or source of content. For example, content sources may include partners such as, Looksmart, Amazon, Expedia, etc. A "schema" is a description of the structure of instances. "Content" are legal values within a schema. A "fragment" is an XPath corresponding to a phrase in a query. A "result" is an instance or XPath for a whole query. "Taxonomy" is a classification hierarchy described in a provider's data. A "relation" is a relationship described in a provider's data, e.g., in MSN® music, artist relates to cd and cd relates to artists.

The present invention overcomes the problem of data providers who often have instances in their own schema for purposes specific to the data provider's implementation. The provider file format of the present invention requires data providers to include information such that the data aggregator will understand how to map to schema and instances, while minimizing the content provider's knowledge of the data aggregator's actual implementation.

In accordance with the schema described in FIGS. 2–15, the present invention, utilizes XPath to refer to nodes defined in an XML Schema document to connect phrases to elements in the schema. For example, invention interprets /carpoint/car as referring to the XPath expression having a form such as /element[name="carpoint"]/complexType/element[name="car"], rather than the expression /carpoint/car referring to a node in a documented formatted according to this schema. In addition, the present invention also allows the application of XPath to types, which serves as a shorthand to refer to a set of elements or attributes in the schema.

As will be described below, the present invention also allows for the use of XPath to define a template to define legal combinations of values. For example, a pattern would be /hotel[city=$1 and state=$2] and then a list of valid city, state pairs. Also, the present invention allows the use of XPath as a pattern to match other XPaths. As such, two XPaths can each be treated as patterns and tested to see if one pattern subsumes the other or the two patterns describe the same set. For example the pattern /expedia/hotel subsumes the pattern /expedia/hotel[name=$1] which subsumes the pattern /expedia/hotel[name="Westin"]. Thus, subsumption may be advantageously applied to XPaths.

Exemplary Schema and Related Instance Documents

Figure 2:
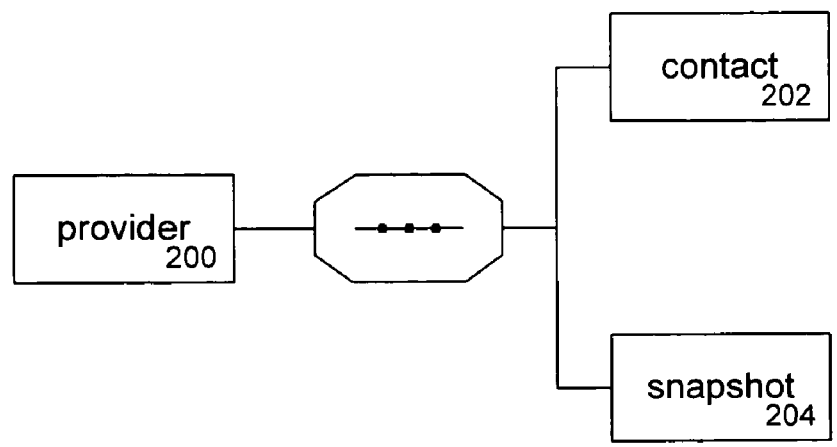
FIGS. 2–3 illustrate an exemplary provider schema and elements thereof.

FIGS. 2–15 describe an exemplary data aggregator XML schema, which defines the data transfer instance document file format of the present invention. A relational database management system, running within the computing environment 100, receives content from external sources using the data transfer file format and makes the data available for users to query via, e.g., the WWW. The database management system may run on a single computer 100 or be distributed over multiple computers 110 interconnected by a network infrastructure. Referring now to FIG. 2, an exemplary provider schema is illustrated. The provider instance document is defined in accordance with the provider schema, and preferably bundles all of the data and definition files for a particular data provider. The provider schema includes a provider element 200 having a contact element 202 and a snapshot element 204. The provider element 202 has an attribute of provider name to uniquely identify the data provider. The contact element defines, for example, a URL that points to the contact information for the provider. The contact element 202 may also be an instance of an address service of the data aggregator. The snapshot element 204 specifies a URL to the data files that define a "snapshot" of data from a provider as well as a refresh and retry duration. In accordance with the refresh or retry duration values, the data aggregator pulls the specified files from a provider location on the specified interval, otherwise the data aggregator waits until a new snapshot appears at the URL to retrieve the provider file.

Figure 3:
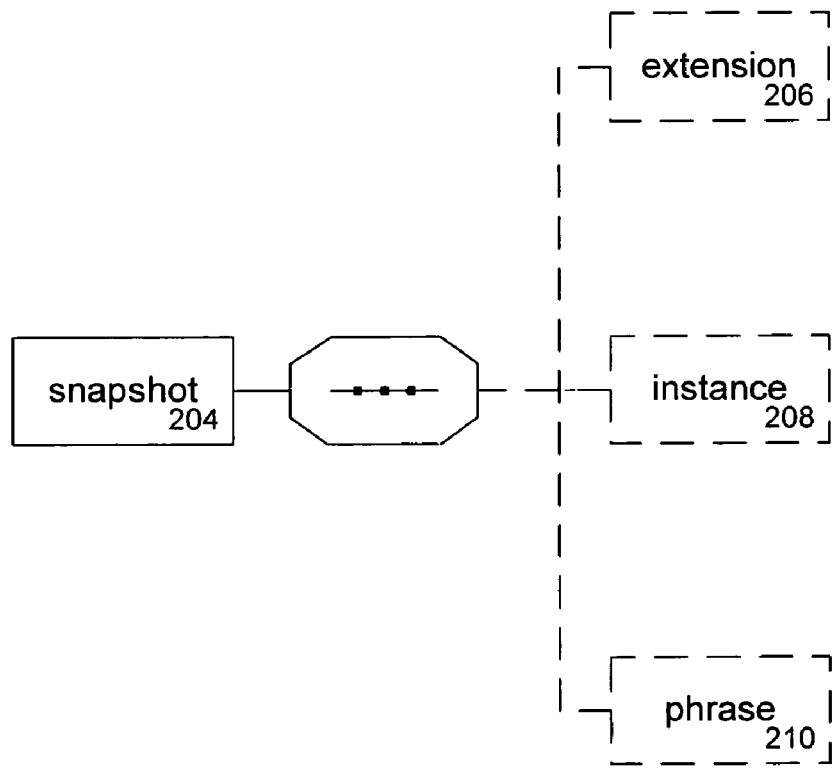

FIG. 3 illustrates the snapshot subelement 204 of FIG. 2 in further detail. The snapshot subelement 204 is a complex type element and includes subelements: extension 206, instance 208 and phrase 210. The extension 206, instance 208 and phrase 210 elements define URIs of a type that specifies an annotation file using a URL where the data aggregator can retrieve the files. The associated instance documents for the exemplary snapshot subelements may comprise, for example,: (1) an Extension file that includes everything but the data provider's instances; (2) an Instance file that includes the data in the provider's schema; and (3) a Phrase file that defines connections from phrases to provider's instances and schema.

In accordance with the exemplary schema of FIGS. 2 and 3, a provider file may have the following format:

```
<provider name=QName>
    <contact url/>
    <snapshot* update=duration
    expiration=duration>
        <extension* url/>
        <instance* url/>
        <phrase* url/>
    </snapshot>
</provider>
``` where Qname is a unique namespace qualified name. In accordance with the present invention, each provider may have more than one provider file having overlapping lifetimes for use by the data aggregator: The extension, instance and phrase files are imported into the data aggregator's database management system via the XML modules and services noted above to update and make the content provider's information available to users of the data aggregator's web site or other query mechanism.

Figure 4:
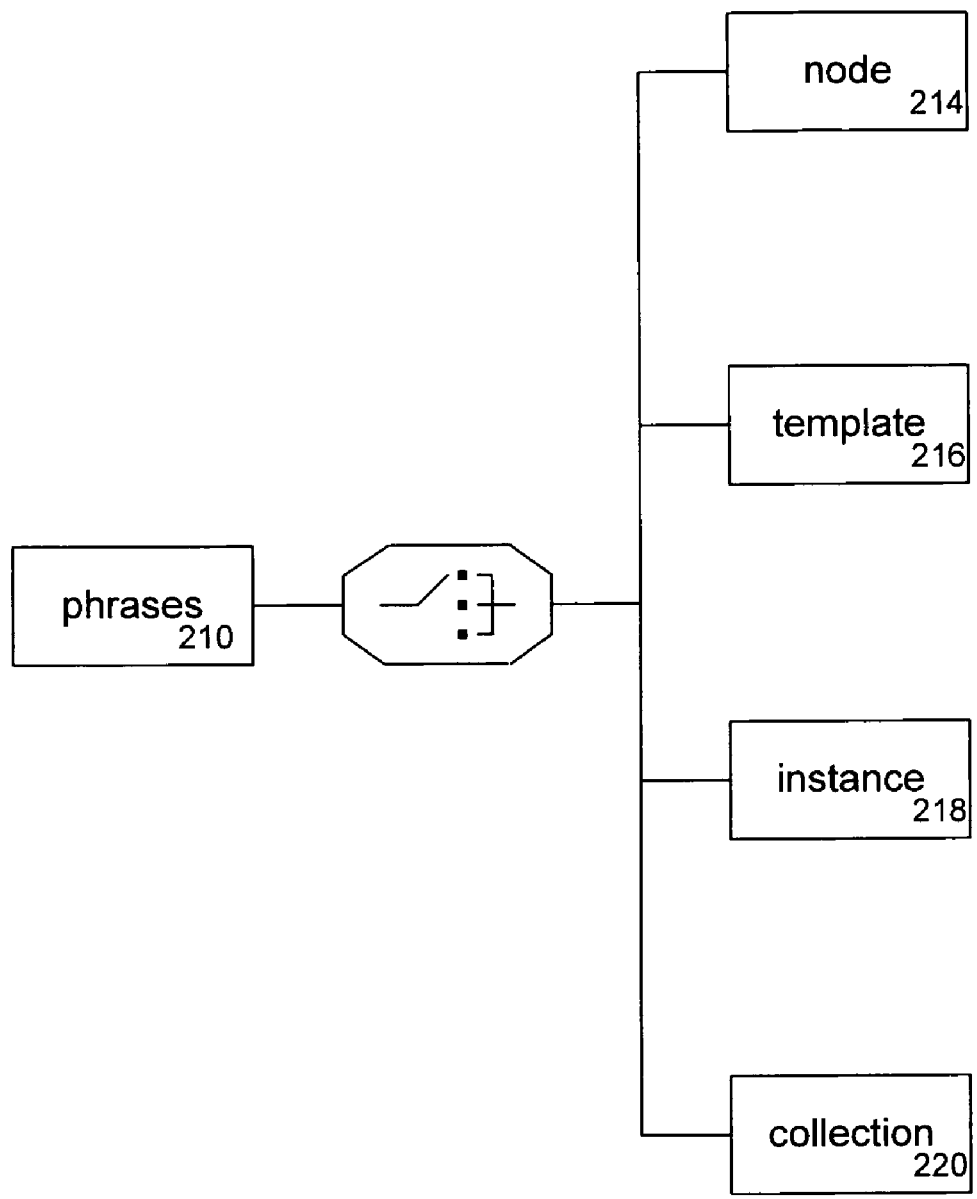
FIGS. 4–7 illustrate an exemplary phrases schema and elements.

FIG. 4 illustrates an exemplary schema of the phrases subelement 210 of the snapshot element 204. The phrases element 210 has four subelements: node 214, template 216, instance 218 and collection 220. The phrase file associated with the phrase schema is used to connect phrases to fragments. The node element 214 associates phrases with an element, attribute, type, function or collection. The template element 216 defines a query fragment. If variables are present, bindings for the variables are found in the value of the corresponding phrase separated by a delimiting character, e.g., "|". The format of entries in a URL may thus have the format: {value1| . . . |valueN|}phrase{|weight}. The instance element 218 annotates a particular substructure within the instance defined by the corresponding key and can be from any provider. This may also be used to attach a subphrase to a particular field within an instance, which is handled as a special case of template 216. The collection element 220 defines a collection of instances as a node that can be annotated. The collection is named using a QName.

The Instance element 218 definition provides for annotating an element within an instance. Key values separated are by the delimiting character, e.g., "|". Thus, exemplary instance content within the instance file may be as follows:

```
<book @id="123"> ...<title>Harry Potter
and the Sorcerers Stone</title> ... </book>
<instance key="AmazonBook" path="./title">
    <namedBy value="123">Sorcerers Stone</namedBy>
</instance>
```

Figure 5:
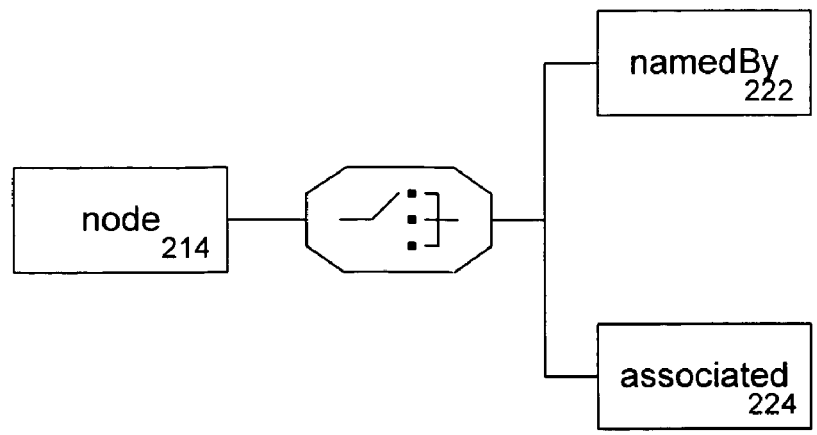

FIG. 5. illustrates the node element 214 in further detail. The node element 214 names (i.e., maps) a node with a phrase. Matching a namedBy phrase 222 is sufficient to consider the corresponding element to be a part of the resulting interpretation. The associated element 224 associates a phrase with a node. The node element 214 has several attributes including a weighting [−1.0, 1.0], 0.5 default, for how strongly the phrase corresponds to the corresponding fragment. The presence of the associated phrase 224 in a query is sufficient to name the corresponding name only if the resulting interpretation also matches at least one namedBy.

An exemplary phrase file containing node content is as follows:

```
<node path="//car">
    <namedBy>car</namedBy>
    <namedBy>auto</namedBy>
    <associated>brake</associated>
</node>
```

Figure 6:
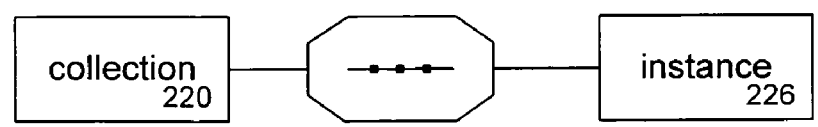

Referring to FIG. 6, the collection element 220 defines a collection of instances. The collection element 220 includes one subelement, an instance element 226. The instance element 226 points to an instance via a keyname and the values that make up the key. For example, a phrase file may contain the following collection content to define collections:

```
<collection name="DigitalCameras">
    <instance key="AZ:Book" value="123"/>
    <instance key="LS:Cat" value="456"/>
</collection>
```

Figure 7:
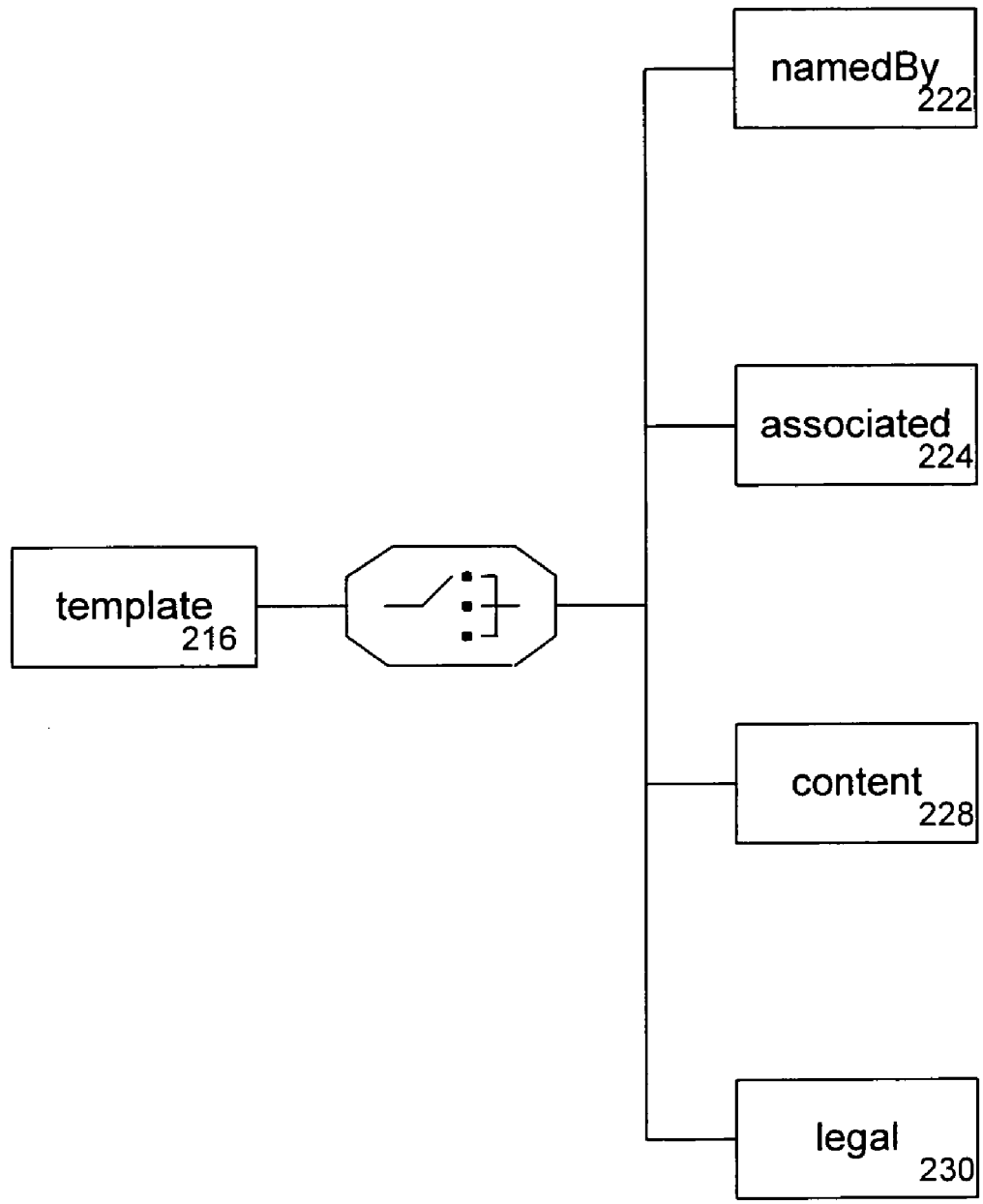

The template element 216 is further described in FIG. 7 and includes four subelements. The namedBy 222 and associated 224 elements have the same attributes as described above with reference to FIG. 5. The content element 228 is used to define nested namedBy where the value and the phrase are the same. The legal element 230 defines a legal combination of values. This allows for restricting the legal combinations of content pieces. It can also be used as a container in cases where it is not desirable to match on the value as in content.

For example, the template content with the provider file may be used for the following restrictions and combinations:
//hotel[rating>2]
//book[contains(desc, "great")]

Template content may also include a query. Values are preferably separated by a delimiter such as "|". An example of such template content is:

```
<template query="//hotel[city=$1 and state=$2]">
    <namedBy value="Seattle|WA">Seattle</namedBy>
    <content value="Seattle|WA"/>
</template>
```

Figure 8:
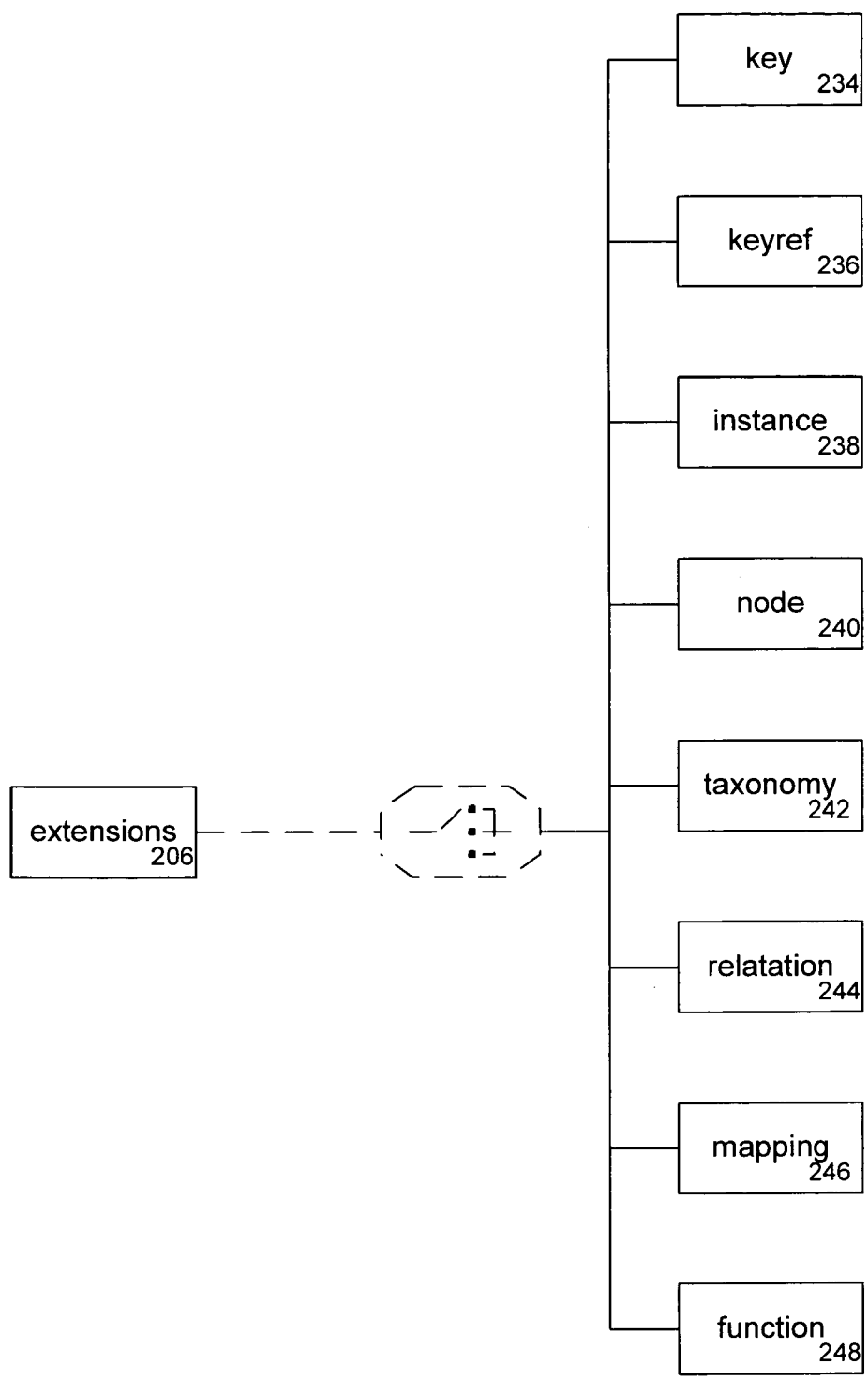
FIGS. 8–15 illustrate an exemplary extension schema and elements.

Referring now to FIG. 8, the schema for the extension element 206 is illustrated. The associated instance file (Extension file) builds on a schema and adds further definitions. The extension element 206 includes a key element 234, a keyref element 236, an instance element 238, a node element 240, a taxonomy element 242, a relation element 244, a mapping element 246, and a function element 248. The key element 238 defines an XSD key outside of the XSD schema file itself. The keyref element 236 defines a keyref outside of the XSD schema file itself. The instance element 238 defines an instance in a partner's schema by identifying the key that identifies the instance. The node element 240 defines the properties of a specific node, i.e. any named element, attribute or function. This may be specified more than once. The taxonomy element 242 defines taxonomy relationships that are encoded in provider instances. There are three possible ways to encode this relationship: instance/parent, instance/child, or child and parent. The relation element 244 defines relationships other than taxonomies that are encoded in provider instances. There are three possible ways to encode this relationship: instance/source, instance/destination, or source and destination. The mapping element 246 defines a mapping from an Xpath pattern to a string. The function element 248 connects together arguments and can be used for connecting multiple schemas.

Figure 9:
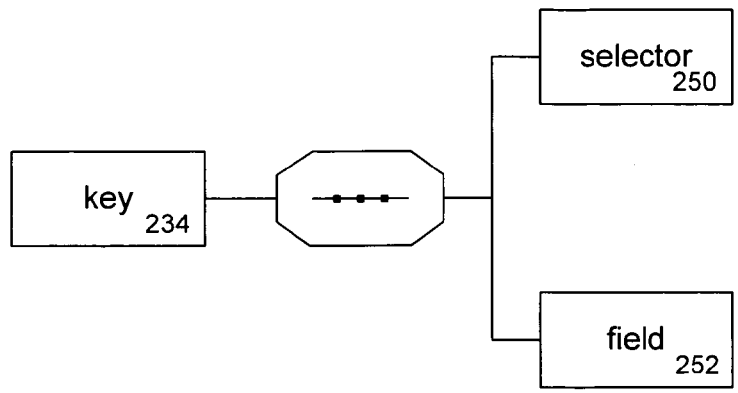

FIG. 9 illustrates the key element 234 in further detail. The key element 234 includes a selector element 250 and a field element 252. The selector element 250 defines the scope of the element that the key defines. The field element 252 defines the fields that together make up a key.

Figure 10:
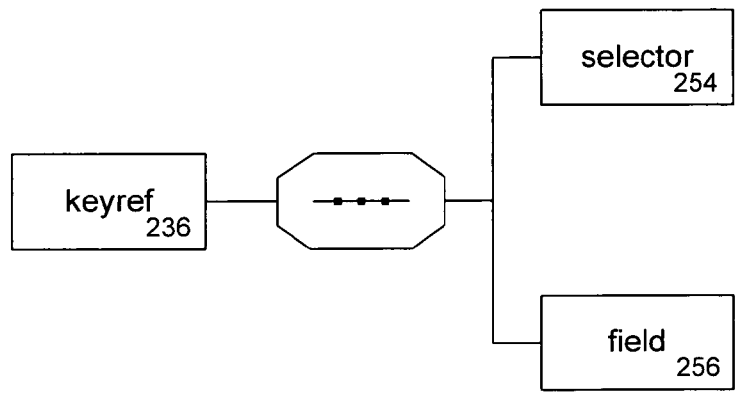

FIG. 10 illustrates the keyref element 236 in further detail. The keyref element 236 includes a selector element and a field element. The selector element 254 defines the scope of the key reference. The field element 256 defines the fields that identify the key values.

Figure 11:
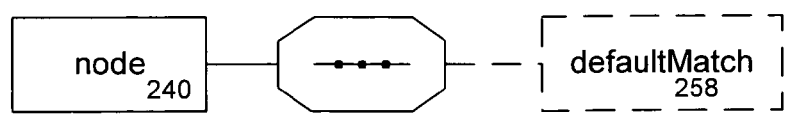

FIG. 11 illustrates the node element 240 in further detail. The node element 240 includes a defaultMatch element 258 that defines the default type of matching for the content found in the specified element or attribute.

Figure 12:
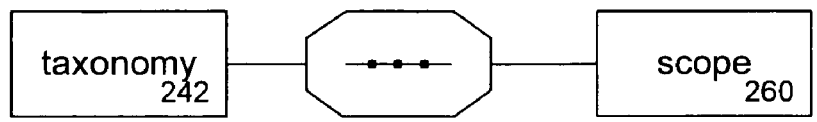
Figure 13:
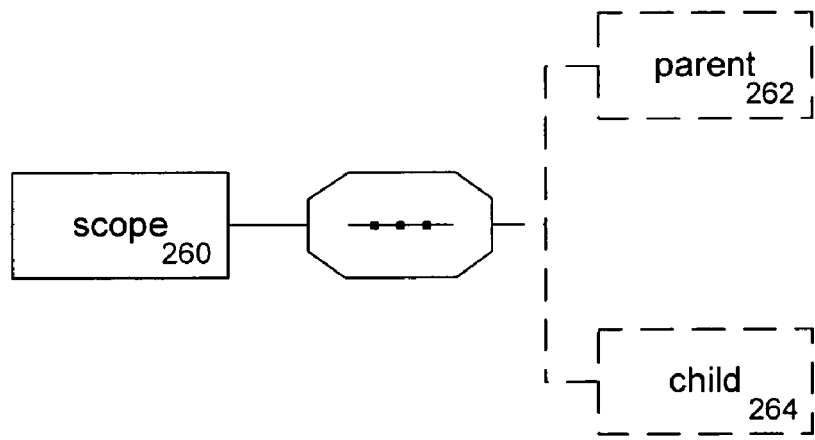

FIGS. 12–13 illustrate the taxonomy element 242 and its scope subelement 260. The scope element 260 has a parent 262 and child element 264, and defines the scope within which the corresponding endpoints are found. The parent element 262 defines a keyref that points to a parent instance with an optional weight for the child parent direction. The child 264 defines a keyref that points to a child instance with an optional weight for the parent child direction.

Figure 14:
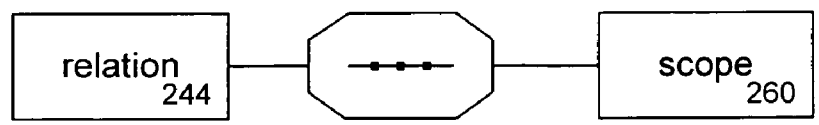

FIG. 14 illustrates the relation element 244, which includes a scope element 260 having a parent and child element, as defined above with regard to the taxonomy element in FIG. 13.

Figure 15:
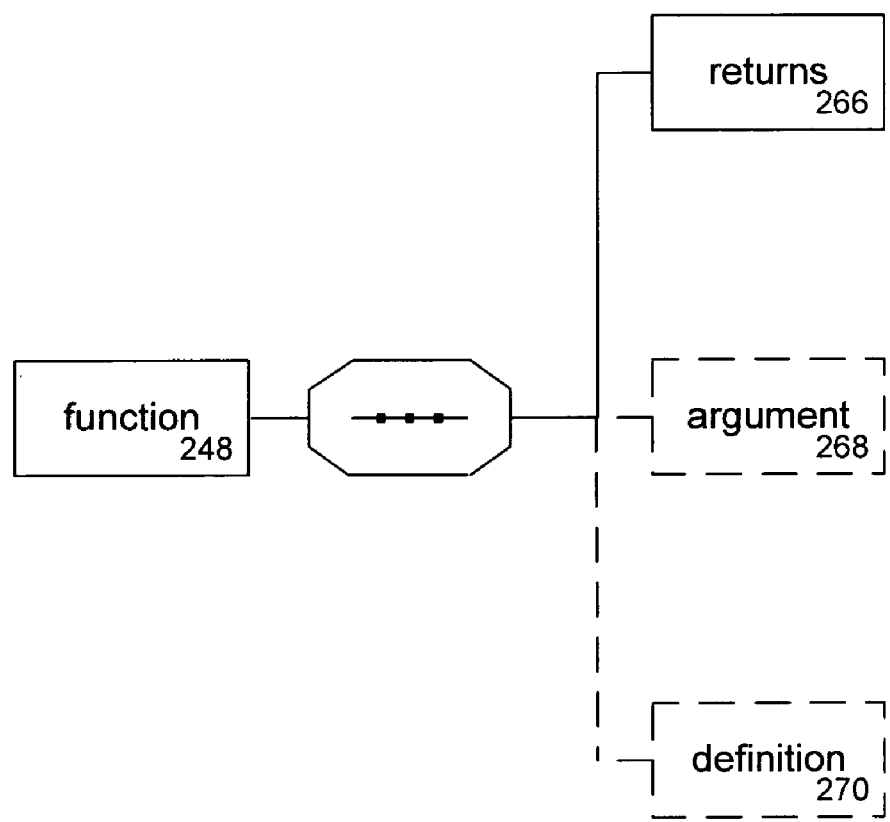

FIG. 15 illustrates the function element 248, which has a returns element 266, an argument element 268 and a definition element 270. The returns element 266 defines the root-element schema of the return results. The argument element 268 defines the function. The definition element 270 defines the actual definition of the function.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. In a database management system associated with a data aggregator, said database management system having an XML exchange mechanism defined by an XML schema, a method of receiving data from content providers, comprising:

defining an XML provider content file format in accordance with said XML schema;

providing, by said data aggregator, said XML provider content file format to said content providers;

receiving, by said data aggregator, a provider file from said content providers that includes locations of a plurality of XML instance documents, each having a structure in accordance with said XML provider content file format; and importing content from said plurality of XML instance documents into said database management system, wherein said XML instance documents include data related to a content provider's schema.

2. The method as recited in claim 1, wherein said plurality of XML instance documents comprise an extension file, an instance file, and a phrase file.

3. The method as recited in claim 2, wherein said extension file includes data related to said content provider's schema.

4. The method as recited in claim 2, wherein said instance file includes information from said content provider's schema that is queryable by users of said database management system.

5. The method as recited in claim 2, wherein said phrase file includes definitions of connections from phrases to said content provider's schema.

6. The method as recited in claim 2, wherein said phrase file includes definitions of a collection of instances.

7. The method as recited in claim 2, wherein said phrase file includes annotations of elements within an instance.

8. The method as recited in claim 2, wherein said phrase file includes mappings of nodes to phrases.

9. The method as recited in claim 2, wherein said phrase file includes definitions of legal combinations of content.

10. In a relational database management system (DBMS) for providing content and services to users via a network infrastructure, the DBMS associated with a data aggregator, a method of populating said system in accordance with an XML schema defining a structure of XML documents used to receive content from sources of said content and services, comprising:

receiving, by said data aggregator, a provider file having references to a location of said content;

retrieving, by said data aggregator, at least one content file from said locations, wherein said content file includes data related to a content provider's schema;

importing said content files into said relational database management system; and providing said content to users via a queryable interface.

11. The method as recited in claim 10, wherein said at least one content file comprises one of an extension file, an instance file, and a phrase file.

12. The method as recited in claim 11, wherein said extension file includes data related to said content provider's schema.

13. The method as recited in claim 11, wherein said instance file includes information from said content provider's schema that is queryable by users of said relational database system.

14. The method as recited in claim 11, wherein said phrase file includes definitions of connections from phrases to said content provider's schema.

15. The method as recited in claim 11, wherein said phrase file includes definitions of a collection of instances.

16. The method as recited in claim 11, wherein said phrase file includes mappings of nodes to phrases.

17. The method as recited in claim 11, wherein said phrase file includes definitions of legal combinations of content.

* * * * *

UNITED STATES PATENT AND TRADEMARK OFFICE
CERTIFICATE OF CORRECTION

PATENT NO. : 6,996,571 B2 Page 1 of 1
APPLICATION NO. : 10/186029
DATED : February 7, 2006
INVENTOR(S) : Christopher Clayton McConnell It is certified that error appears in the above-identified patent and that said Letters Patent is hereby corrected as shown below:

In column 8, line 66, after "aggregator" delete ":" and insert -- . --, therefor.

In column 12, line 35, in Claim 10, delete "locations" and insert -- location --, therefor.

Signed and Sealed this

Twenty-eighth Day of July, 2009

JOHN DOLL
*Acting Director of the United States Patent and Trademark Office*